United States Patent [19]

Friedericy et al.

[11] 4,036,080
[45] July 19, 1977

[54] MULTI-RIM FLYWHEEL

[75] Inventors: Johan A. Friedericy, Palos Verdes Estates; Dennis A. Towgood, Huntington Beach, both of Calif.

[73] Assignee: The Garrett Corporation, Los Angeles, Calif.

[21] Appl. No.: 528,388

[22] Filed: Nov. 29, 1974

[51] Int. Cl.² .................... F16F 15/30; F16C 15/00; H02K 7/02
[52] U.S. Cl. .................................. 74/572; 74/230.4; 29/159 R; 156/74; 156/75
[58] Field of Search .................... 74/572, 230.4, 230.5; 29/159 R, 159.1; 310/67; 156/74, 75

[56] References Cited
U.S. PATENT DOCUMENTS

| | | | |
|---|---|---|---|
| 284,369 | 9/1883 | Blank | 74/572 |
| 305,965 | 9/1884 | Sanders | 74/230.4 |
| 1,365,473 | 1/1921 | Emmett | 74/572 |
| 1,426,339 | 8/1922 | Sperry | 74/572 |
| 3,296,886 | 1/1967 | Reinhart, Jr. | 74/572 |
| 3,602,067 | 8/1971 | Wetherbee | 74/572 |
| 3,683,216 | 8/1972 | Post | 310/67 |
| 3,724,288 | 4/1973 | Jakubowski | 74/572 |
| 3,859,868 | 1/1975 | Post | 74/572 |
| 3,964,341 | 6/1976 | Rabenhorst | 74/573 R X |

FOREIGN PATENT DOCUMENTS

| | | | |
|---|---|---|---|
| 61,717 | 6/1913 | Austria | 74/572 |
| 156,072 | 11/1904 | Germany | 74/572 |
| 251,866 | 10/1912 | Germany | 74/572 |
| 7,262 | 3/1890 | United Kingdom | 74/572 |

*Primary Examiner*—Samuel Scott
*Assistant Examiner*—Don E. Ferrell
*Attorney, Agent, or Firm*—Joel D. Talcott; Albert J. Miller

[57] ABSTRACT

A plurality of nested rims are mounted on spokes of a flywheel hub member in a manner causing the rim assembly to have a noncircular configuration while the flywheel is at rest. Expansion of the rim assembly and the hub member during high speed flywheel operation causes the rim assembly to assume a substantially circular configuration with each rim frictionally engaging its adjacent rims while the inner rim is frictionally engaged by the spokes.

27 Claims, 13 Drawing Figures

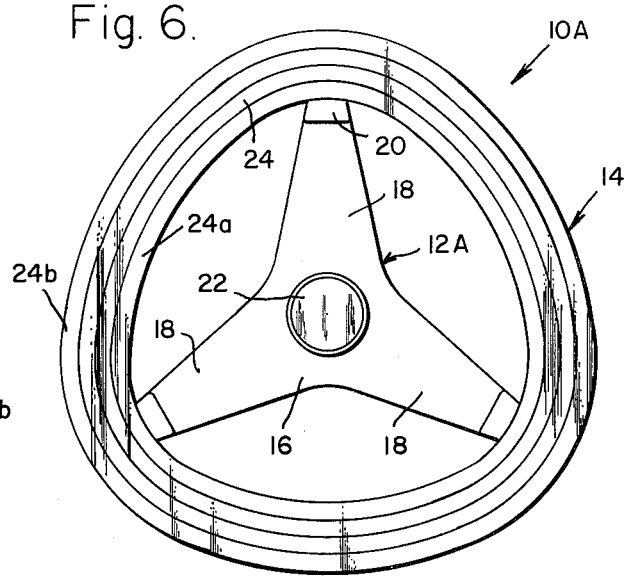
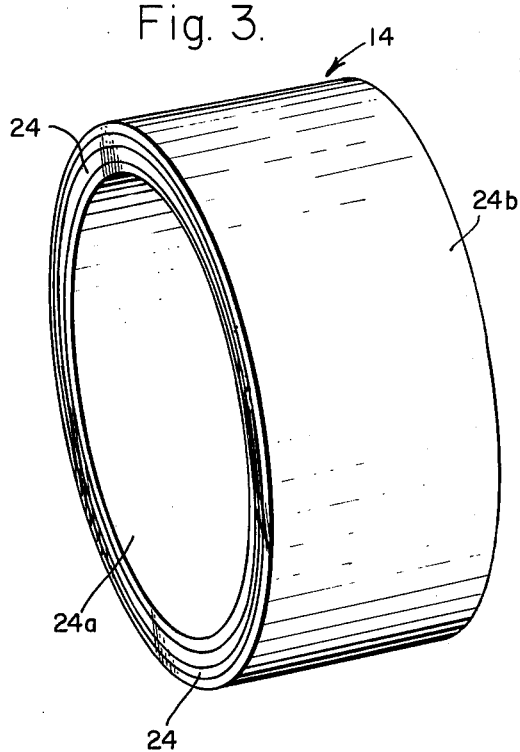
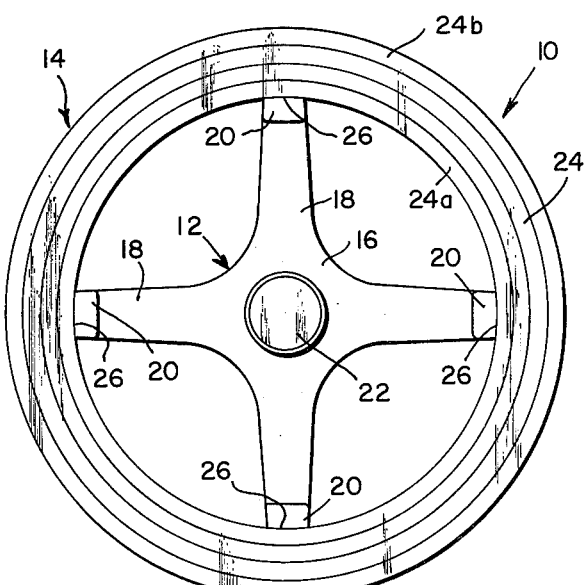
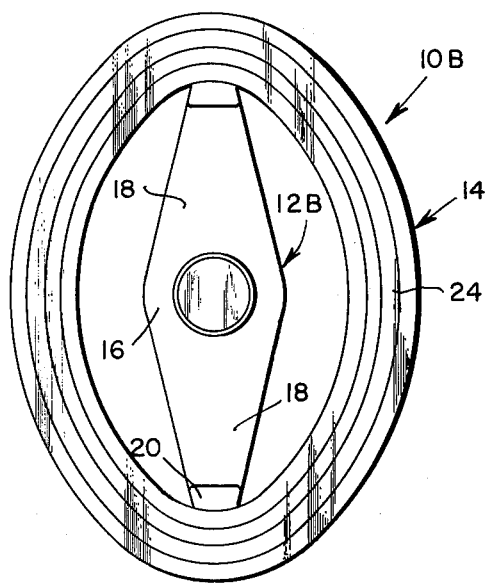

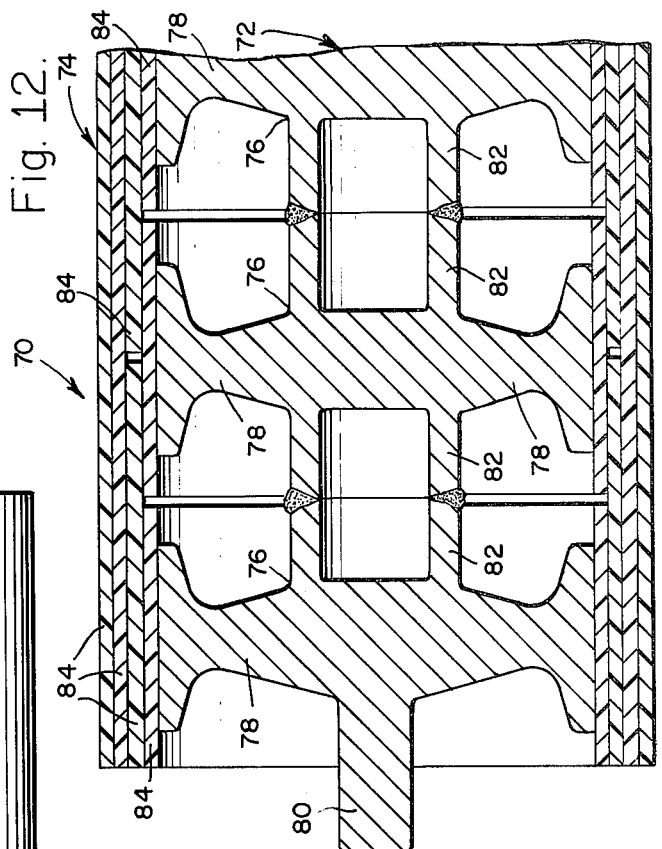
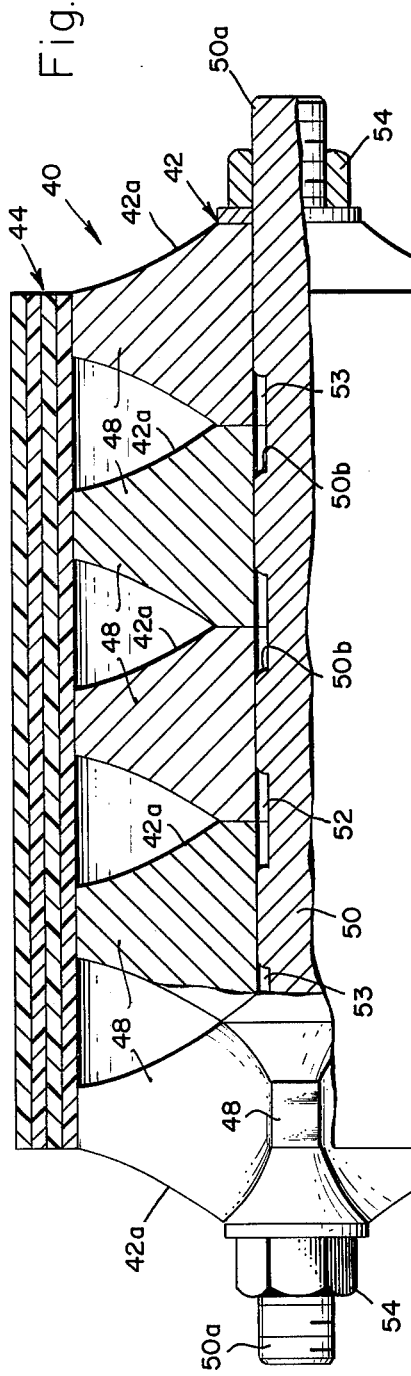
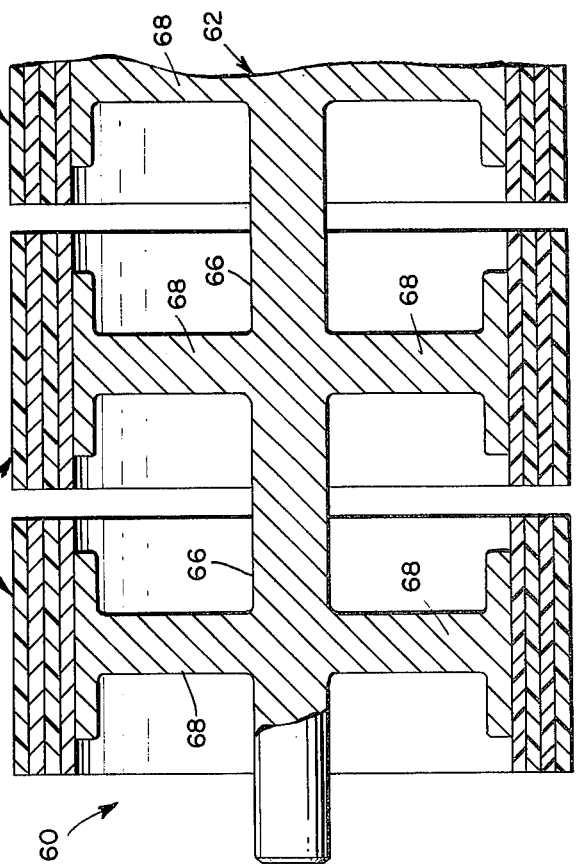

MULTI-RIM FLYWHEEL

This invention relates to flywheels and, more particularly, to a novel flywheel construction wherein a multisection rim assembly is caused to attain a circular configuration while running at a predetermined operating speed without the need for straps or other restraints utilized in prior art devices.

Modern advances in urban transportation systems have been geared toward the transportation of a maximum number of people with the utilization and waste of a minimum amount of energy. Additionally, it has been desired to minimize the amount of pollution produced by the vehicles. Accordingly, new vehicle power systems have been investigated at great length. One such device is the flywheel.

A flywheel may be utilized as a primary power source for a small vehicle or as an auxilixary power supply providing added energy when it is necessary for acceleration. Energy is stored in the flywheel by causing it to rotate at high speed (often in excess of 2000 ft./sec.) around a hub. By mounting the flywheel on low friction bearings and in an evacuated chamber, energy losses can be greatly minimized. Rotation of the flywheel powers a generator which supplies electric power to run a motor for powering the vehicle. During braking, the motor and generator switch functions so that energy which would normally be lost in the form of heat during braking is returned to the flywheel and stored for later utilization. Thus, the flywheel provides a highly efficient and simple means for storing energy for vehicles or other devices.

However, construction of such a flywheel presents substantial difficulties. For example, some prior art flywheels have been constructed with a circular metallic rim or hoop connected by thin spokes to a hub. The amount of energy stored in such a flywheel is proportional to the mass of the rim and to the square of the rotational speed. Accordingly, it would appear that by taking a massive flywheel and spinning the wheel at increasing speeds, as much energy as desired could be stored in the flywheel. However, as the mass and speed increase, the hoop stress resulting from centrifugal force also increases, ultimately surpassing the tensile strength of the material and causing the flywheel to come apart. This problem is even more prevalent in solid flywheels. Accordingly, a material for use in a flywheel must have very high strength both in the tangential and radial directions.

While it might initially appear that heavier materials would be more suited for use in flywheel construction, it has been found that a decrease in mass permits the flywheel to be operated at a much higher speed for the same material strength. Inasmuch as the energy stored is proportional to the first power of the mass and to the second power of the angular speed, the use of lighter materials of comparable strength actually permits flywheels to store greater amounts of energy. Accordingly, a high strength to density ratio is a principal requirement in the selection of a flywheel material.

Great success has been obtained by constructing the rim of a filament material wound unidirectionally in a matrix. One example of this construction is fiberglass wound in a suitable epoxy resin. Experiments with flywheels constructed of such materials showed that the hoop strength provided by the wound filaments comfortably exceeded the tangential stresses applied to the flywheel. However, the radial stresses tended to be greater than the strength of the matrix, causing the flywheel to delaminate, i.e., the flywheel would break up into substantially concentric rings.

It was thus determined that a more suitable flywheel construction would be one comprising a plurality of nested concentric circular cylinders, each made of a wound filament material in a matrix. The thickness of each rim portion of such a flywheel is limited so that the radial stress across the portion is substantially uniform, i.e., the variation from the inner surface to the outer surface is not sufficient to produce delamination of the cylinder.

While this construction has been recognized as ideally superior, no one has heretofore been able to construct an operational multirim flywheel. Because flywheels must be operated at high rotational velocities, this being particularly true to flywheels constructed of low density material, the centrifugal force acting on the flywheel is substantial and increases greatly toward the outer surface of the flywheel. This results in a great degree of radial growth as the flywheel approaches its operating velocity. As as result, the rim sections tend to separate from each other and from the hub. This generally results in destructive failure of the flywheel.

Previous attempts to solve this problem have been directed toward the use of straps or other restraints to hold the flywheel rim sections together and to hold the rim assembly to the hub. None of these methods has heretofore successfully produced a flywheel capable of operation at practical energy density levels.

In accordance with this invention, a novel flywheel is disclosed which permits the utilization of a multi-section rim assembly, maintains the structural integrity of the flywheel from rest to maximum operational velocity, and ensures that the flywheel will be in a properly dynamically balanced configuration at its operational velocity.

The novel flywheel of this invention comprises a multi-segment rim assembly mounted on a hub having a predetermined number of spokes. The radius of the inner surface of the rim assembly is smaller at rest than is the radius of the spokes on which it is to be mounted so that the rim assembly is mounted on the spokes in a noncircular configuration. When the flywheel is operating at its designed speed, centrifugal force acting upon the components of the flywheels causes the rim assembly to attain a substantially circular configuration in proper dynamic balance with each segment of the rim assembly frictionally engaging its adjacent segments and the inner segment of the rim assembly bonded to or frictionally engaged by the spokes.

These and other advantages of the invention will be more readily apparent when the following specification is read in conjunction with the appended drawings, wherein:

FIG. 3 is a perspective view of a rim assembly for use in the flywheel of FIG. 1;

FIG. 5 is an end plan view similar to FIG. 1 of the flywheel rotating at its operational speed;

FIG. 6 is an end plan view of an alternate embodiment of the flywheel of this invention;

FIG. 7 is an end plan view of an additional embodiment of the invention;

FIG. 10 is a partially sectioned side view similar to FIG. 8 showing another flywheel embodiment;

FIGS. 11 and 12 are cross-sectional views showing further flywheel embodiments in accordance with this invention.

Figure 1:
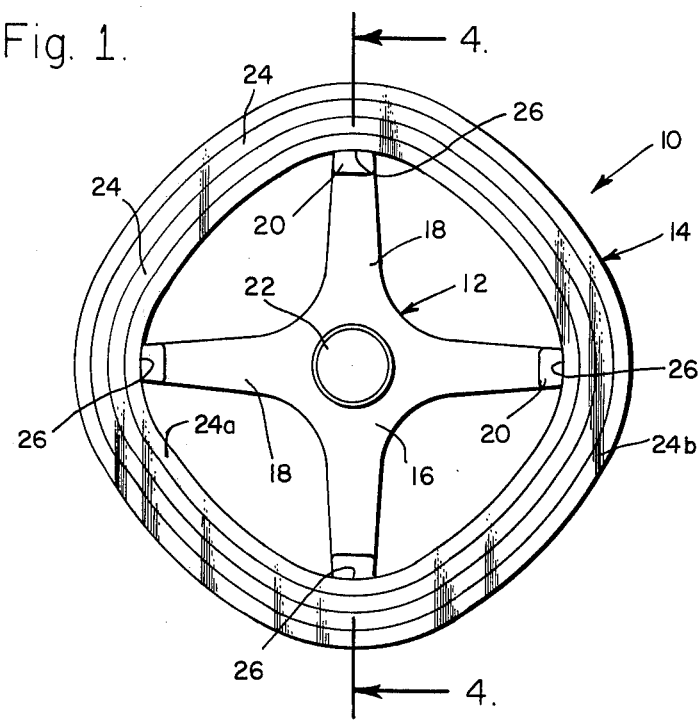
FIG. 1 is an end plan view of a flywheel in accordance with this invention in its rest configuration.

Referring now to the drawings, FIG. 1 illustrates a flywheel 10 constructed in accordance with this invention and comprising a hub and spoke assembly or spider 12 and a rim assembly 14.

Figure 4:
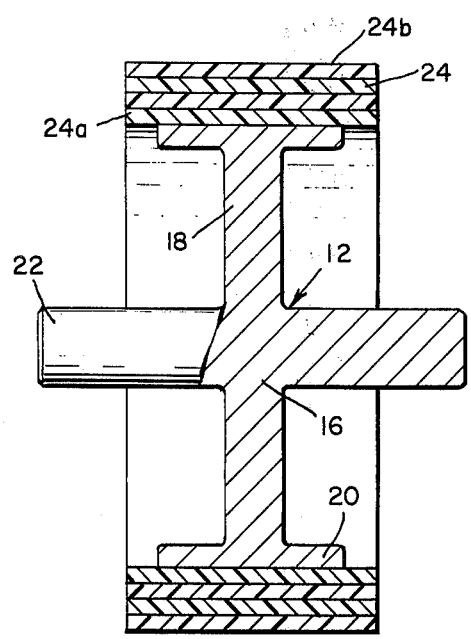
FIG. 4 is a cross-sectional view taken generally along the line 4—4 of FIG. 1.
Figure 2:
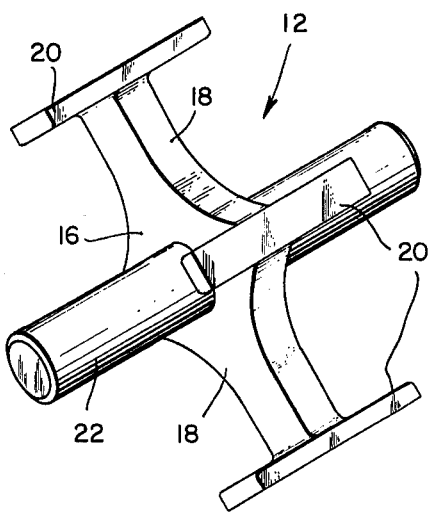
FIG. 2 is a perspective view of a spider for use in the flywheel of FIG. 1.

The spider 12 is best illustrated in FIGs. 1, 2 and 4 and generally comprises a central or hub portion 16 from which extend a plurality of spokes 18. The spokes may have any desired configuration but preferably have a shape which minimizes centrifugal stress in the spoke. This permits the use of light structural materials, such as aluminum, in the manufacture of the spider. An outer portion 20 of each spoke 18 may be enlarged to accommodate mounting of the rim assembly 14 in a manner to be described subsequently herein. A shaft 22 may be secured to or integrally formed with the spider 12 to accommodate mounting of the flywheel on low friction bearings (not shown) for operation in a manner well known to those skilled in the art.

The rim assembly 14 is illustrated in FIGS. 1, 3 and 4 and preferably comprises a plurality of nested tubular rim members 24 including an inner rim member 24a and an outer rim member 24b. In the preferred embodiment, the rim assembly is constructed by winding each rim member of a filament material on a suitable form in an appropriate matrix material. After the inner rim member 24a has been wound, it is dried and cured. The second rim member 24 is then wound over the inner rim member 24a and the combination is dried and cured. This procedure is repeated until the outer rim 24b has been constructed. The final drying and curing completes the manufacture of the rim assembly 14. It should be noted that it may be necessary to place a further layer of material such as "Mylar" plastic film between the rim members to prevent adhesion at the engaging surfaces of adjacent members. The rim assembly may be constructed in a generally cylindrical configuration. However, as will be shown subsequently herein, other configurations may be utilized in accordance with the teachings of this invention.

In accordance with this invention, the rim assembly 14 is constructed so that the inner radius of the inner rim member 24a is less than the radius of the spokes 18 of the spider 12 when the flywheel 10 is at rest. Accordingly, the rim assembly 14 cannot readily be mounted on the spider 12. To effect mounting, the rim assembly 14, which is cylindrical, must be distorted into a noncircular configuration such as is shown in FIG. 1 so that the inner radius of the inner rim member 24a is substantially equal to the radius of the spokes 18 at a plurality of points 26, the number of points 26 conforming to the number of spokes 18 on the spider 12.

It may be desirable to form the rim assembly 14 in substantially the shape shown in FIG. 1 in order to avoid much or all of the deformation required to fit a cylindrically-shaped rim assembly on to the spider 12.

Referring now to FIG. 5, when the flywheel 10 is operated as by spinning it at a substantial operating speed, which may be in excess of 2000 ft./sec., the centrifugal force causes the entire flywheel to expand radially and causes the rim assembly 14 to expand circumferentially. As a result of this expansion, the outer surface of the rim member 24b assumes a shape having a substantially circular cross section, thereby causing the flywheel 10 to have a highly stable running configuration. The remainder of the rim members 24, however, having been subjected to a lesser degree of centrifugal force, do remain in a slightly noncircular configuration. Accordingly, substantial frictional engagement is retained between adjacent rim members and between the inner rim member 24a and the outer portions 20 of the spokes 18. Thus, the structural integrity of the flywheel 10 is retained without the utilization of straps or other special restrains even at the high rotational velocities necessary to efficiently utilize a flywheel as an energy storage device.

When the flywheel 10 is slowed to a stop, the rim assembly 14 regains the configuration shown in FIG. 1. It will be readily understood that if the flywheel were operated at a speed less than its designed operating speed the shape of the rim assembly 14 would be somewhere between the configurations shown in FIGS. 1 and 5.

In constructing a flywheel in accordance with this invention, the dimensions of the various components depend upon several variables, including the materials of which the spider 12 and rim assembly 14 are constructed, the amount of energy to be stored, the desired rotational velocity, and the weight distribution of the flywheel.

One operative embodiment of the flywheel of this invention will be set forth for the purposes of illustration, it being understood that substantial variation of the recited parameters can be readily accomplished by those skilled in the art.

The flywheel 10 of FIGS. 1–5 may be constructed entirely of light weight materials. If the spokes 18 are configured to minimize centrifugal stresses, such as the shape shown in FIG. 1, the spider 12 may be manufactured of aluminum. The rim members 24 of the rim assembly 14 are wound of filaments of glass fiber of the type known as E-glass in an epoxy matrix. Each of the rim members is about 0.25 inch thick and has a density of 0.000192 lb. - sec.$^2$/in.$^4$. The rim assembly 14 is composed of four of the rim members 24 and has an outside diameter of about 25.63 inches and an inside diameter of about 23.62 inches.

The rotational speed of this flywheel is chosen to limit the tangential stress due to rotation to 100,000 psi in the outer drum. Accordingly the rotational speed was chosen as about 1900 feet per second.

During operation at 1900 feet per second, several dimensional changes occur, each of which may be readily calculated by those skilled in the art. The outer rim member 24b experiences a growth of about 0.1813 inch in its radius; additionally, the rim assembly 14 experiences a reduction in thickness of about 0.0032 inch due to the high tangential stress at this speed.

The aluminum spider, at this high rotational speed, will experience a radial increase of about 0.0168 inch. This is substantially smaller than the increase in radius of the rim assembly 14. Accordingly, the outside diameter of the spider 12, while at rest, must be sufficiently large to accommodate the rim growth at operating velocity so that the rim will stay in contact with the spokes. Additionally, it is desirable to provide a 5 percent safety margin so that no separation will occur until the flywheel 10 has reached 105 percent of designed operating speed. In accordance with this requirement, the spider would be constructed with an outside diameter of 23.988 inches. This exceeds the inside diameter of the rim assembly 14 by about 0.36 inch, preventing the rim assembly 14 from being mounted on the spider 12 in a circular configuration, but sufficiently close in dimension to permit mounting the rim assembly 14 while it is in configuration such as shown in FIG. 1.

In determining the number of rim members 24 and the thickness of each rim member it has always been necessary, as previously indicated to consider the distribution of radial stress across the rim member so as to prevent any delamination which might otherwise occur. In constructing a flywheel in accordance with this invention, however, it is also necessary to take into account the need for the rim assembly 14 to assume a configuration for assembly of the flywheel as shown in FIG. 1, and to assume a substantially circular configuration at its operational velocity. Thus, the rim members 24 must not be so thick that they would tend to crack or be otherwise damaged during physical deformation.

An alternative embodiment of the flywheel of this invention is illustrated in FIG. 6 wherein a flywheel 10A has its rim assembly 14 mounted on a spider 12A which is similar construction to the spider 12 of FIG. 2 except that it has three spokes 18. Again, the rim assembly 14 is mounted in a noncircular configuration on the spider 12A and expands to a substantially circular configuration when the flywheel 10A reaches its operational velocity.

A flywheel 10B is illustrated in FIG. 7 and has its rim assembly 14 mounted on a spider 12B which has two spokes 18 thereon. While the rest configuration of the rim assembly 14 again differs from the other embodiments illustrated, the theory and details of operation of the flywheel 10B are the same.

While it is theoretically possible to construct flywheels with any desired number of spokes 18, there will always be an upper limit imposed by the requirement that the inner radius of the rim assembly 14 be less than the radius of the spokes 18 and yet be fitted onto the spokes. At a certain point, depending by the operating parameters of the flywheel, it will not be possible to add any additional spokes and fit the rim assembly on to the spider without damage to either. It will be readily understood that, because of considerations of mounting and stability, a spider having three or four spokes 18 is generally preferred.

One manner in which the amount of energy to be stored by a flywheel can be increased is to elongate the flywheel along its axis, thus, by increasing its mass, adding to the amount of energy which can be stored thereby. FIGS. 8-12 illustrate various embodiments whereby this can be accomplished with the flywheel of this invention.

Figure 8:
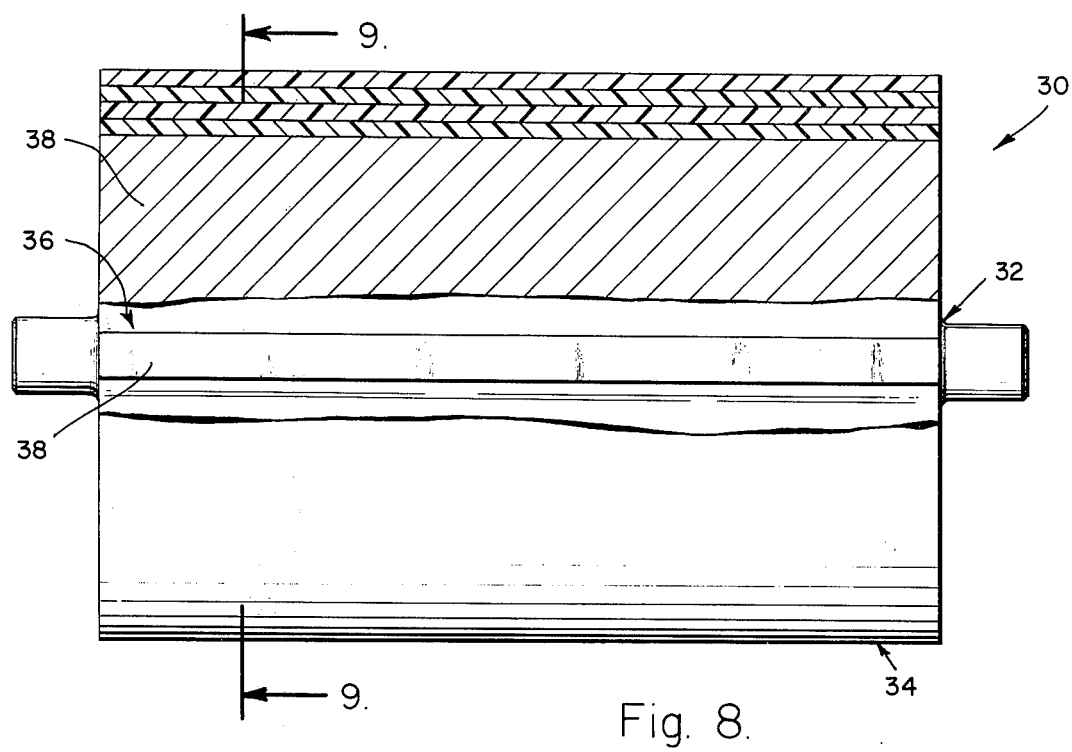
FIG. 8 is a partially sectioned side view of a further embodiment.
Figure 9:
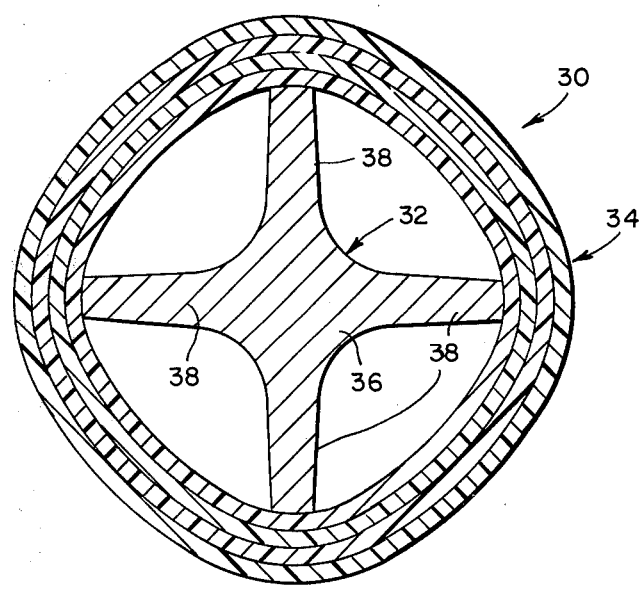
FIG. 9 is a cross-sectional view taken generally along the line 9—9 of FIG. 8.

FIGS. 8 and 9 illustrate a flywheel 30 having a spider 32 and a rim assembly 34. As can be seen in FIG. 9, the structure of the flywheel 30 is substantially the same as that of flywheel 10 except that the rim assembly 34 and a hub portion 36 and spokes 38 of the spider 32 are elongated in a direction along the axis of the flywheel.

A similar construction may be accomplished by utilizing less material within the spider by constructing a flywheel 40 as shown in FIG. 10 having a spider assembly 42 and a rim assembly 44. The spider assembly 42 generally consists of a plurality of spider portions 42a which are positioned adjacent each other with spokes 48 thereof in alignment. The spider portions are attached by a tie bolt 50 which is positioned in aligned axial passages 52 in the spider portions 42a. A pair of nuts 54 are threaded onto the tie bolt 50 to hold the spider assembly 42 together. End portions 50a of the tie bolt 50 may serve as a mounting shaft for the flywheel.

By use of this construction, the flywheel 40 can be made of substantially any desired length simply by varying the number of spider portions 42a joined together in construction of the spider assembly 42. The rim assembly 44 is then constructed to an equivalent length and mounted on spokes 48. Clearly, in this embodiment, proper alignment of the spokes 48 of adjacent spider portions is critical since mis-alignment could completely prevent the assembly of flywheel 40. Accordingly, a plurality of key portions 50b on the tie bold 50 are positioned in keyways 53 to maintain alignment of the spider portions.

A flywheel 60 is illustrated in FIG. 11 and comprises a spider 62 and a plurality of rim assemblies 64. The spider 62 has an elongated shaft 66. Positioned at spaced intervals along the shaft and radiating therefrom are spokes 68 disposed so that each group of spokes 68 forms a structure substantially similar to the spiders 12, 12A or 12B illustrated respectively in FIGS. 1, 6 and 7. One advantage of the flywheel 60 is that each of the rim assemblies 64 is identical. Changing the length of the flywheel 60 does not require any change in the structure of the rim assembly. It is only necessary to add an additional rim assembly 64 to any added sets of spokes 68.

FIG. 12 illustrates a flywheel 70 having a spider assembly 72 and a rim assembly 74. In this embodiment, the spider assembly 72 comprises a plurality of spider portions 76, each having a plurality of spokes 78 thereon. The spider portions at each end of the spider assembly 72 preferably have a shaft portion 80 on one side thereof. Connecting portions 82 on the spider portions 76 are welded or otherwise suitably attached to form the spider assembly 72. Again, great care must be taken to align the spokes 78 on adjacent spider portions 76 so that the rim assembly 74 may be mounted thereon.

Each pair of the rim assemblies 74 may be constructed of a plurality of rim members 84. Rim assembly 74 illustrates a staggered cylinder assembly wherein rim members of varying lengths are utilized, the rim members of one layer overlapping and frictionally engaging two or more rim members on the layer beneath. Utilizing a staggered assembly in connection with the welded spider assembly 72, a flywheel 70 of any desired length can be constructed utilizing a small number of standard components.

Figure 13:
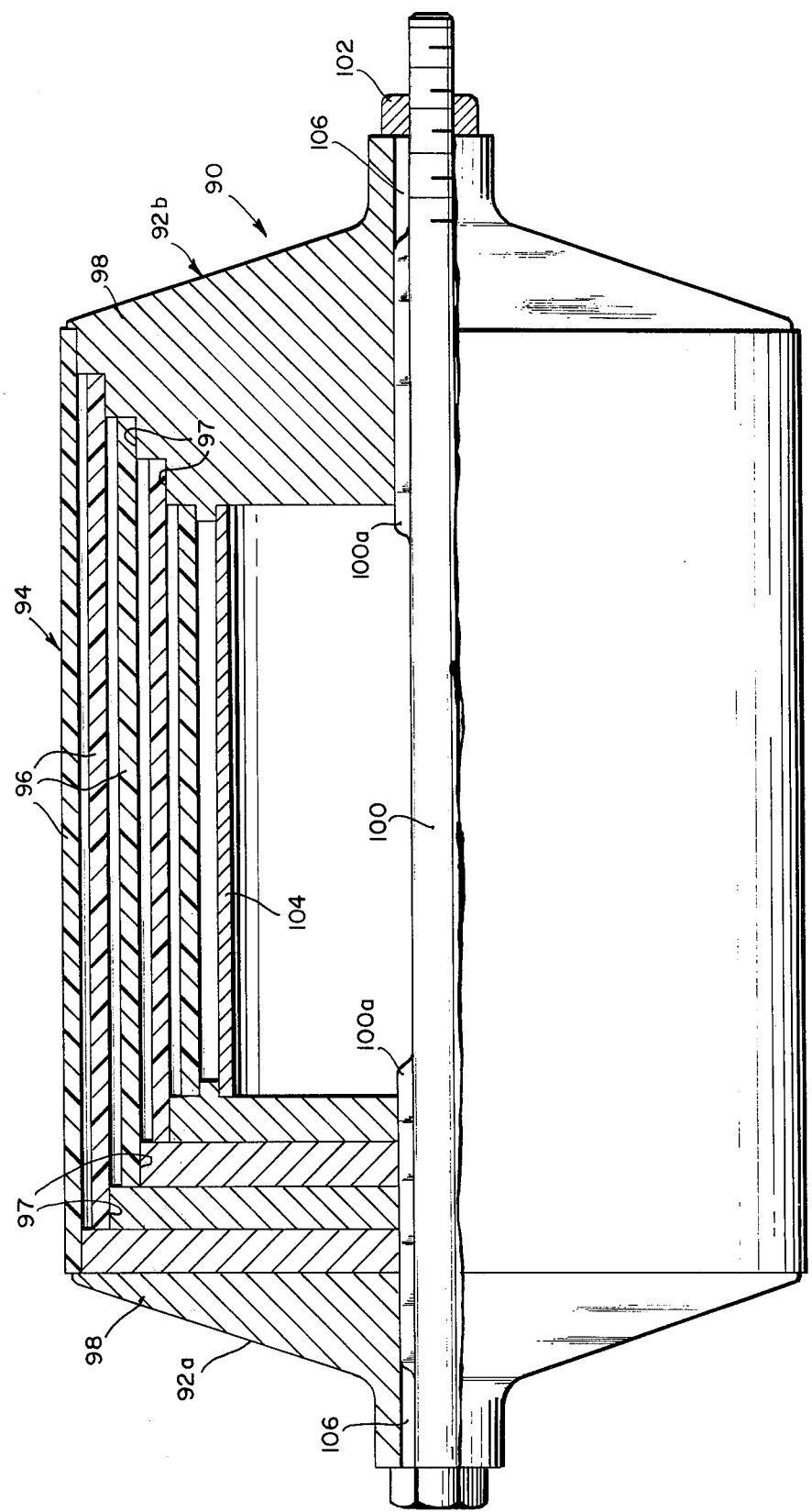
FIG. 13 is a partially sectioned side view showing another flywheel made in accordance with this invention.

FIG. 13 illustrates an alternate embodiment wherein a flywheel 90 has a pair of spiders 92a and 92b supporting a rim assembly 94, individual rim members 96 of the rim assembly 94 being supported at their end portions by end supports 97 on spokes 98 of the spiders 92a and 92b. Each spider may be of multi-piece construction, such as the spider 92a, are constructed of a single piece, such as the spider 92b, and are preferably connected by a tie bolt 100, being tightened by a nut 102 against a metal spacer 104 which ensures rigidy of the structure. Key portions 100a of the tie bolt 100 are positioned in keyways 106 in the spiders 92a and 92b to ensure proper alignment thereof.

In this configuration, the rim members 96 may abut or be spaced from adjacent rim members in the rim assembly 94, each of the rim members being individually supported and held in a noncircular configuration at the end portions when the flywheel 90 is at rest.

When the flywheel 90 is operated at its high rotational velocity, each of the rim members 96 expands radially attaining a substantially circular configuration. If the rim members 96 are spaced in the manner illustrated in FIG. 13, frictional engagement to maintain the rotational velocity of each rim member will not come from frictional engagement between adjacent rim members. In this case, each rim member is engaged at its end portions by the spiders 92 so that the structural integrity of the flywheel is maintained.

It has been found during construction of the flywheel of this invention that it is not always possible to construct the rim assembly with the precise weight distribution required for optimum dynamic balance and stability while the flywheel is running at its operation velocity. However, due to the manner of construction of the flywheel of this invention, the flywheel tends to improve its balance characteristics during operation. Because no straps or other restraints are utilized in the flywheel of this invention and the rim members of the rim assembly only frictionally engage each other and are not otherwise secured, rotational shifting of the rim members within the rim assembly is possible, in accordance with the laws of physics, so that the rotating flywheel attains a configuration best enhancing its dynamic balance and stability at running speed.

We claim:

1. A method of storing energy in a flywheel having a shaft with spokes of a predetermined radius and a rim assembly having an inner radius less than the radius of said spokes, said method comprising the steps of positioning the rim assembly on the spokes of said shaft in a noncircular configuration, and causing rotational motion of said flywheel at a speed at which said rim assembly assumes a substantially circular configuration.

2. A method of constructing a flywheel having a shaft with spokes of a predetermined radial dimension, said method comprising the steps of forming a plurality of nested cylindrical rims having an inner radius less than said predetermined radial dimension, deforming said cylindrical rims to produce a plurality of enlarged points on said rims having a radial dimension not less than said predetermined radial dimension, mounting said rims on said spokes with the enlarged points respectively aligned with said spokes, and releasing said rims to firmly engage said spokes.

3. A flywheel comprising hub means having a plurality of spokes, and a plurality of nested rims positioned on said spokes, said rims having a noncircular configuration when said flywheel is at rest and having a substantially circular configuration when said flywheel is spinning at a preselected speed.

4. A flywheel as in claim 3 including an additional hub means, a plurality of spokes on the additional hub means, and means for securing both of said hub means with the spokes on said hub means respectively aligned with the spokes on said additional hub means.

5. A flywheel as in claim 4 wherein said plurality of nested rims is positioned on the spokes of both of said hub means.

6. A flywheel as in claim 4 including an additional plurality of nested rims positioned on the spokes on said additional hub means.

7. A flywheel as in claim 3 wherein said plurality of nested rims has an outer surface, an inner surface and a plurality of engaging surfaces, the outer surface has a substantially circular configuration when the flywheel is spinning at said preselected speed, and the inner surface and engaging surfaces have a substantially noncircular configuration when the flywheel is spinning at said preselected speed.

8. A flywheel as in claim 7 wherein each of said spokes has a predetermined radius, said nested rims are formed with a substantially cylindrical shape, and said inner surface has a radius smaller than the predetermined radius of said spokes.

9. A flywheel as in claim 7 wherein said nested rims are formed with a noncircular configuration, and the inner surface of said plurality of nested rims has a plurality of expanded points equal in number to said spokes.

10. A flywheel as in claim 9 wherein each of said spokes has a predetermined radial dimension and said inner surface has a radial dimension at each of said expanded points substantially equal to the radial dimension of said spokes.

11. A flywheel comprising spider means having a hub and a plurality of spokes extending from the hub and having a radial dimension, and nested rim means having an average radial dimension less than the radial dimension of the spokes and mounted on the spider in a noncircular configuration.

12. A flywheel as in claim 11 wherein said flywheel rotates at a predetermined speed and said nested rim means is in a substantially circular configuration when said flywheel rotates at said predetermined speed.

13. A flywheel as in claim 11 including an additional spider means, and shaft means connecting the hubs of said spider means.

14. A flywheel as in claim 13 wherein said shaft means is formed integrally with said spider means.

15. A flywheel as in claim 13 wherein a shaft segment is on each hub and the shaft segments are joined to form said shaft means.

16. A flywheel as in claim 13 wherein said nested rim means comprises a plurality of nested rims mounted on the spokes of both of said spiders.

17. A flywheel as in claim 13 wherein said nested rim means comprises a first plurality of nested rims mounted on the spokes of one of said spiders and a second plurality of nested rims mounted on the spokes of the other of said spiders.

18. A flywheel as in claim 13 wherein said nested rim means comprises a plurality of nested rim layers, one of said layers comprising two rim segments and another of said layers comprising two rim segments overlapping the rim segments of said one of said layers.

19. A flywheel comprising first spider means including a plurality of spokes, each spoke having a first end support having a first radial dimension and a second end support having a second radial dimension, second spider means including a plurality of spokes, each spoke having a first end support having said first radial dimension and a second end support having said second radial dimension, first tubular rim means having an average inner radial dimension smaller than said first radial dimension and having end portions mounted on the first end supports of said spiders in a noncircular configuration, second tubular rim means having an average inner radial dimension smaller than said second radial dimension and having end portions mounted on the second end supports of said spiders in a noncircular configuration, and means for attaching said spider means with the spokes of said first spider means respectively aligned with the spokes of said second spider means.

20. A flywheel as in claim 19 wherein said rim means have edges and said spiders include means for frictionally engaging the edges of said rim means during rotation of said flywheel.

21. A method of constructing a flywheel having at least two rims disposed around a hub, said method comprising the steps of constructing a first tubular rim, constructing a second tubular rim on the first tubular rim without adhesion between the first and second rims, and mounting the first and second rims on a hub.

22. The method of claim 21 wherein said hub includes a plurality of spokes, and mounting of the first and second rims on the hub comprises the steps of holding the rims in a noncircular configuration shaped to fit on the spokes, positioning the rims around the spokes, and releasing the rims to operatively engage the spokes.

23. A flywheel comprising hub means and nested rim means positioned on said hub means, said nested rim means comprising a plurality of individual rims and including means for preventing adhesion between adjacent rims.

24. A flywheel as in claim 23 wherein said adhesion preventing means comprises a sheet of material disposed between adjacent rims.

25. A flywheel as in claim 24 wherein said sheet of material comprises plastic film.

26. A flywheel as in claim 23 wherein said nested rim means includes a first rim mounted on said hub means and a second rim mounted on the first rim, and the first rim operably drives the second rim when said flywheel is rotating.

27. A flywheel as in claim 26 wherein said hub means frictionally engages said first rim for rotating said nested rim means.

* * * * *